(12) United States Patent
Kishikawa et al.

(10) Patent No.: US 12,222,237 B2
(45) Date of Patent: Feb. 11, 2025

(54) COMBINATION WEIGHING DEVICE WITH MULTIPLE HOPPERS AND MODES

(71) Applicant: Ishida Co., Ltd., Kyoto (JP)

(72) Inventors: Mikio Kishikawa, Ritto (JP); Hiroe Konishi, Ritto (JP); Kazuro Ishiyama, Ritto (JP); Toru Morihira, Ritto (JP); Ryoji Nishimura, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 425 days.

(21) Appl. No.: 17/572,977

(22) Filed: Jan. 11, 2022

(65) Prior Publication Data

US 2022/0221329 A1   Jul. 14, 2022

(30) Foreign Application Priority Data

Jan. 13, 2021   (JP) ................................ 2021-003316
Mar. 5, 2021   (JP) ................................ 2021-035539

(51) Int. Cl.
*G01G 19/393*   (2006.01)

(52) U.S. Cl.
CPC .................................. *G01G 19/393* (2013.01)

(58) Field of Classification Search
CPC .................................................. G01G 19/393
See application file for complete search history.

(56) References Cited

U.S. PATENT DOCUMENTS

| 4,454,924 | A | * | 6/1984 | Minamida | ............... | G01G 19/34 |
| | | | | | | 177/25.18 |
| 5,048,623 | A | * | 9/1991 | Toyoda | ................ | G01G 19/393 |
| | | | | | | 177/25.18 |
| 2008/0245578 | A1 | * | 10/2008 | Kawanishi | .......... | G01G 19/393 |
| | | | | | | 177/25.11 |
| 2009/0294183 | A1 | * | 12/2009 | Kawanishi | .......... | G01G 19/393 |
| | | | | | | 177/25.18 |
| 2020/0072656 | A1 | | 3/2020 | Kamigaito et al. | | |

(Continued)

FOREIGN PATENT DOCUMENTS

| CN | 110537081 A | 12/2019 |
| CN | 110873603 A | 3/2020 |
| JP | S63-065322 A | 3/1988 |

(Continued)

OTHER PUBLICATIONS

The extended European search report issued by the European Patent Office on May 20, 2022, which corresponds to European Patent Application No. 22150699.1-1001 and is related to U.S. Appl. No. 17/572,977.

(Continued)

*Primary Examiner* — Natalie Huls
(74) *Attorney, Agent, or Firm* — Studebaker & Brackett PC

(57) ABSTRACT

A combination weighing device (1) performs combination weighing of at least two different articles, weighing hoppers (5) and booster hoppers (6) are divided into at least two groups on the basis of types of the articles, a controller (1) sets each of the groups to either a first mode or a second mode, in the group set to the first mode, the articles retained in the weighing hopper (5) are discharged to a receiver (9) via the booster hopper (6), and in the group set to the second mode, the articles retained in the weighing hopper (5) are discharged to either the booster hopper (6) or the receiver (9).

10 Claims, 5 Drawing Sheets

(56) References Cited

U.S. PATENT DOCUMENTS

2021/0063233 A1     3/2021   Kawanishi
2021/0389169 A1*   12/2021   Suemichi ............. G01G 19/387

FOREIGN PATENT DOCUMENTS

| JP | 5314506 B2 | 10/2013 |
| JP | 2018-077075 A | 5/2018 |
| JP | 2020-101389 A | 7/2020 |
| WO | 2008/108329 A1 | 9/2008 |

OTHER PUBLICATIONS

An Office Action mailed by China National Intellectual Property Administration on Jul. 3, 2024, which corresponds to Chinese Patent Application No. 202210034238.0 and is related to U.S. Appl. No. 17/572,977.

An Office Action; mailed by the Japanese Patent Office on Nov. 19, 2024, which corresponds to Japanese Patent Application No. 2021-035539.

* cited by examiner

COMBINATION WEIGHING DEVICE WITH MULTIPLE HOPPERS AND MODES

CROSS-REFERENCE TO RELATED APPLICATIONS

This application is based upon and claims the benefit of priority from Japanese Patent Applications Nos. 2021-003316 filed on Jan. 13, 2021 in Japan and 2021-035539 filed on Mar. 5, 2021 in Japan, the entire contents of which are incorporated herein by reference.

TECHNICAL FIELD

The present invention relates to a combination weighing device.

BACKGROUND ART

Conventionally, a combination weighing device of a first type (see, for example, Japanese Unexamined Patent Publication No. 2018-77075), which is configured to discharge articles that are retained in a weighing hopper into either a booster hopper or a discharge chute, is known.

In addition, a combination weighing device of a second type, which is configured to discharge articles retained in a weighing hopper into a discharge chute via a booster hopper, is known.

SUMMARY OF THE INVENTION

Technical Problem

However, the aforementioned combination weighing device of the first type has a problem in that there is a large drop when articles are discharged from the weighing hopper to the discharge chute, and cracking and chipping of the articles is highly likely.

Furthermore, in the aforementioned combination weighing device of the second type, the likelihood of cracking or chipping of articles is low because the drop when the articles are discharged from the weighing hopper to the booster hopper is small; however, the weighing accuracy is low due to the reduced number of combinations of hoppers from which the articles are discharged.

Therefore, the present invention was conceived in view of the foregoing problems, and it is an object of the present invention to provide a combination weighing device that enables cracking and chipping of articles to be minimized while improving weighing accuracy.

Solution to Problem

A combination weighing apparatus according to one embodiment is summarized as including: a plurality of weighing hoppers that temporarily retain the articles and acquire weighing values of the retained articles before discharging the articles downstream; a plurality of booster hoppers that are arranged downstream of the weighing hoppers and temporarily retain the articles discharged from the weighing hoppers before discharging the articles downstream; a receiver that receives the articles discharged from the weighing hoppers or the booster hoppers; and a controller that performs combination weighing on the basis of the acquired weighing values and discharges the articles constituting a target from the weighing hoppers or the booster hoppers, wherein the weighing hoppers and the booster hoppers are divided into at least two groups on the basis of types of the articles, the controller sets each of the groups to either a first mode or a second mode, in the group set to the first mode, the articles retained in the weighing hopper are discharged to the receiver via the booster hopper, and in the group set to the second mode, the articles retained in the weighing hopper are discharged to either the booster hopper or the receiver.

Advantageous Effects of Invention

According to the present invention, it is possible to provide a combination weighing device that enables cracking and chipping of articles to be minimized while improving weighing accuracy.

DESCRIPTION OF EMBODIMENTS

Figure 1:
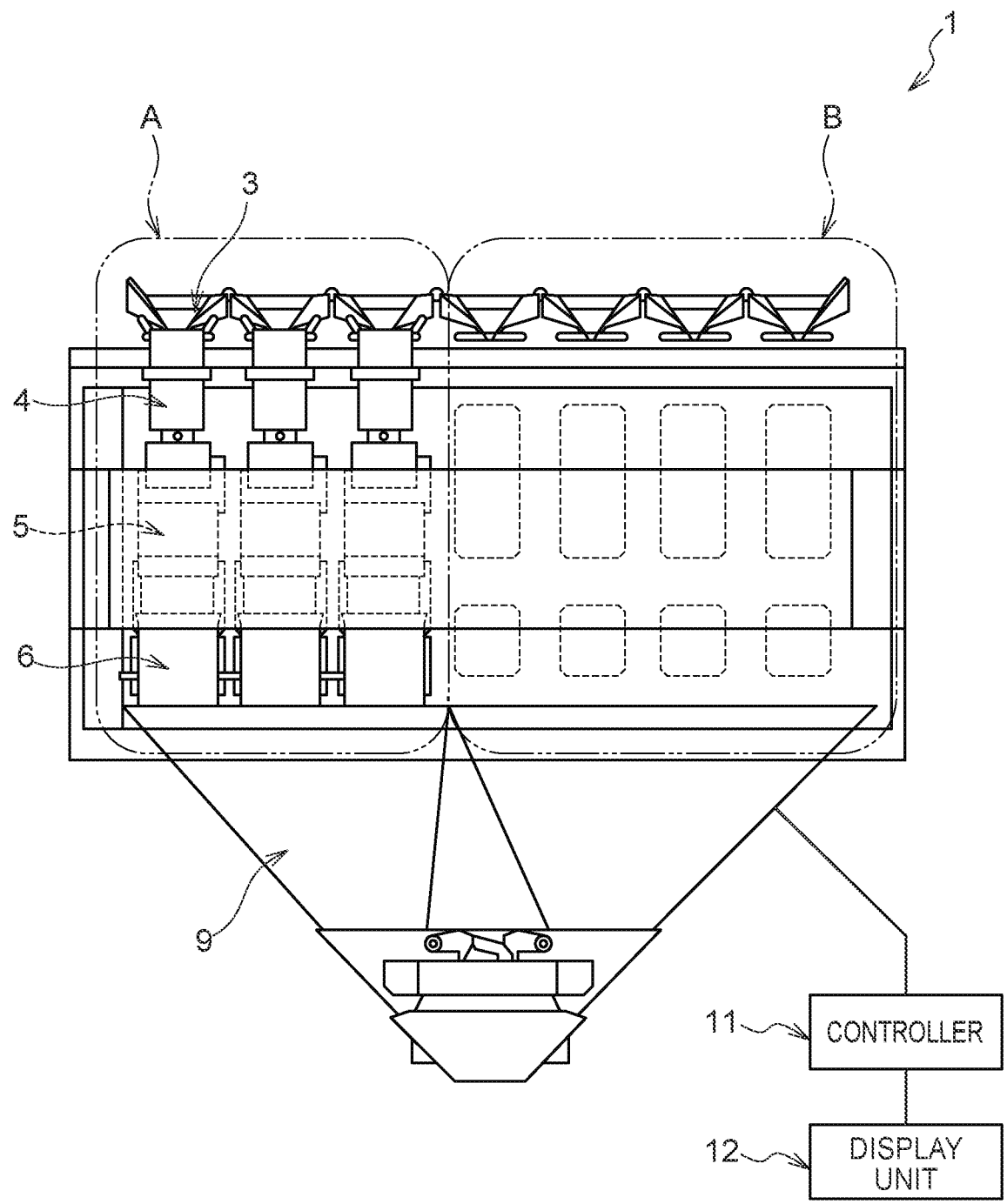
FIG. 1 is a diagram illustrating an example of the overall configuration of a combination weighing device according to a first embodiment.

Hereinafter, the present embodiment will be described in detail with reference to the attached drawings. In the following description of the drawings, the same or similar parts are denoted by the same or similar reference symbols. However, note that the drawings are schematic, and ratios of dimensions are different from actual ones. Therefore, specific dimensions and the like are determined in consideration of the following description. Moreover, there may be portions where dimensional relationships or proportions are different among the drawings. In this specification and the drawings, elements having substantially the same function and configuration are denoted by the same reference numerals to omit redundant description, and elements not directly related to the present invention are omitted.

First Embodiment

A combination weighing device 1 according to a first embodiment of the present invention will be described hereinbelow with reference to FIGS. 1 to 4. This combination weighing device 1 according to this embodiment mixes and weighs at least two different articles.

As illustrated in FIG. 1, the combination weighing device 1 according to this embodiment has a dispersion feeder (not illustrated), a plurality of radiation feeders 3, a plurality of pool hoppers 4, a plurality of weighing hoppers 5, a plurality of booster hoppers 6, a plurality of discharge chutes 9, a controller 11, and a display unit 12.

The dispersion feeder is a flat, conical member. Articles are supplied to the dispersion feeder by a supply conveyor (not illustrated) that is provided outside, that is, above the dispersion feeder. The dispersion feeder vibrates due to an electromagnet (not illustrated) provided at the bottom of the dispersion feeder. The dispersion feeder conveys the articles supplied to a conveyance surface, in the direction of the radiation feeder 3, and supplies the articles to the radiation feeder 3.

Each radiation feeder 3 is a sheet-metal member molded by bending a stainless steel plate. Each radiation feeder 3 is arranged in a linear manner along the article conveyance end portion of the dispersion feeder. More specifically, as illustrated in FIG. 1, the radiation feeders 3 are arranged parallel to the horizontal direction such that the respective conveyance surfaces thereof are parallel.

The conveyance surfaces of the radiation feeders 3 are caused to vibrate by an electromagnet (not illustrated) that is provided at the bottom of the radiation feeders 3. Each radiation feeder 3 conveys articles outward through the vibration of the conveyance surface. The radiation feeders 3 supply the conveyed articles to the weighing hoppers 5.

Each pool hopper 4 temporarily stores the articles supplied from each of the radiation feeders 3 and then delivers the articles to the weighing hoppers 5, which are each arranged below the pool hoppers 4.

Each weighing hopper 5 temporarily retains the articles delivered from each of the pool hoppers 4 and acquires weighing values of the retained articles before discharging the articles downstream (to the booster hoppers 6 or discharge chutes 9). More specifically, the weighing hopper 5 has gates that open exclusively both ways, and opening one gate discharges the articles into the booster hopper 6, while opening the other gate discharges the articles into the discharge chute 9.

Figure 4:
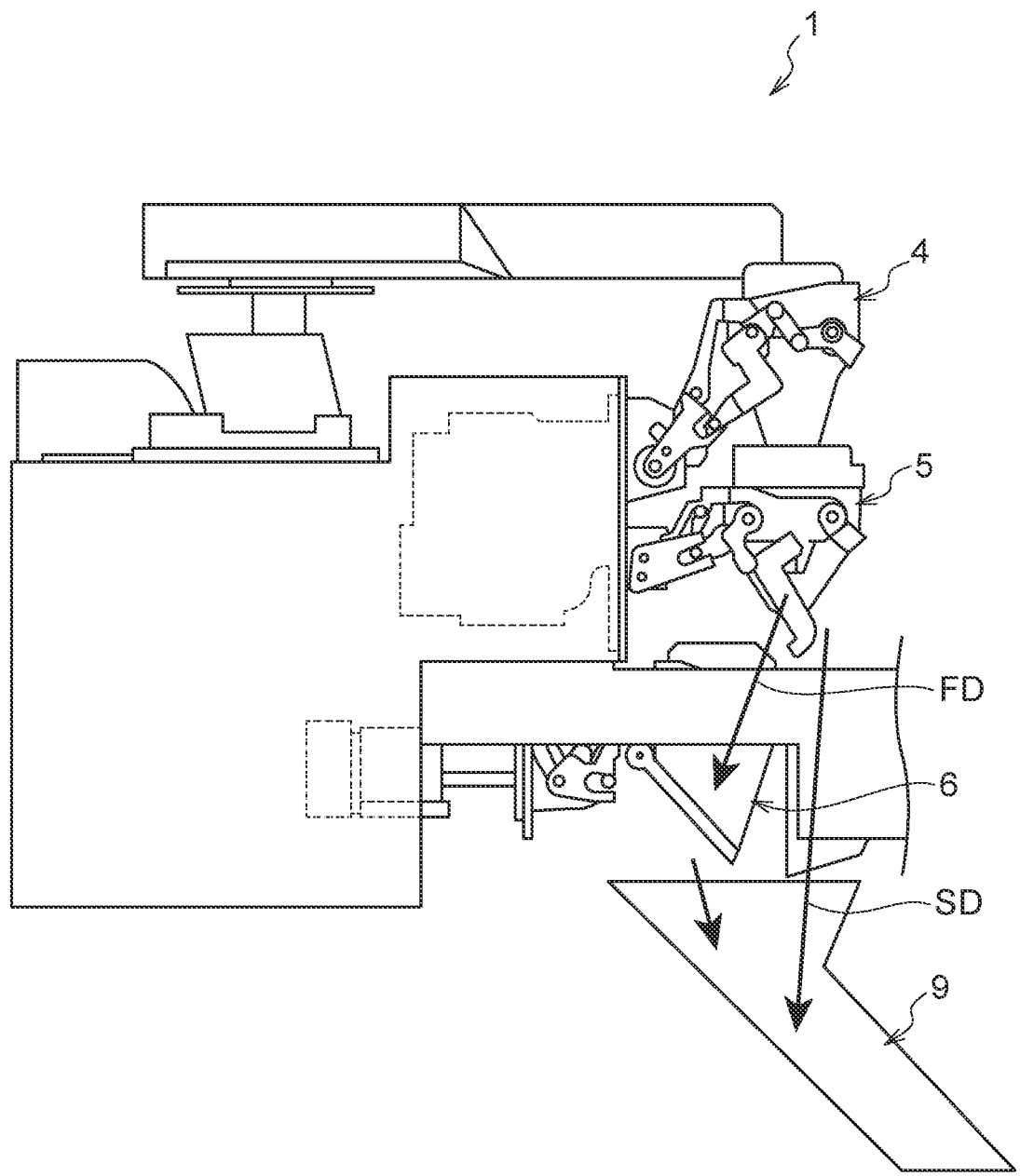
FIG. 4 is a diagram illustrating an example of a method of discharging articles in a group that is set to a second mode in the combination weighing device according to the first embodiment.

More specifically, by exclusively opening the double-swing gate, the weighing hopper 5 discharges the weighed articles by sorting same in either a first direction FD or a second direction SD, as illustrated in FIG. 4.

The booster hoppers 6 are each arranged downstream of the weighing hoppers 5 and temporarily retain the articles discharged from each of the weighing hoppers before discharging the articles downstream (to a receiving part).

The booster hoppers 6 acquire weighing values acquired by the weighing hoppers 5 at the time when the articles are discharged by the respective weighing hoppers 5 that are arranged correspondingly upstream. In other words, the weighing values acquired by the weighing hoppers 5 are shifted with respect to the booster hoppers 6 together with the discharge of the articles. Thus, the weighing values of the articles retained in the booster hoppers 6 can be identified.

Although a case in which the discharge chute 9 is used as the aforementioned receiving part (receiver) is illustrated in this embodiment, the present invention is not limited to or by such a case. More specifically, a configuration in which a conveyor belt is arranged instead of the discharge chute 9 is also possible. In this case, the booster hoppers 6 cause the retained articles to directly drop onto the conveyor belt when the articles are discharged. In this case, the receiving part is a conveyor belt.

Note that each booster hopper 6 has a weighing sensor and may be configured to re-acquire the weighing values of the articles retained in the booster hoppers 6.

The discharge chutes 9 receive the articles discharged from the weighing hoppers 5 or the booster hoppers 6, and cause the articles to slide into an article processing device that is arranged downstream. This article processing device can be any device as long as the device implements predetermined processing for the articles that have slid, such as a vertical packaging machine or a conveyor belt that individually packages the articles.

The controller 11 performs combination weighing on the basis of the weighing values acquired by the weighing hoppers 5 and the weighing values shifted by the booster hoppers 6, and discharges articles constituting targets from the weighing hoppers 5 or the booster hoppers 6.

In the combination weighing device 1 according to this embodiment, the weighing hoppers 5 and the booster hoppers 6 are each divided into at least two groups on the basis of the types of articles constituting targets of the combination weighing. More specifically, the combination weighing device 1 virtually combines a plurality of sets as a group when the radiation feeder 3, the pool hopper 4, the weighing hopper 5, and the booster hopper 6, which are arranged vertically correspondingly as illustrated in FIG. 1, are combined to form a single set. In the example in FIG. 1, three sets are set as a group A and four sets are set as a group B.

Here, the controller 11 sets each of the aforementioned groups to either the first mode or the second mode.

Figure 2:
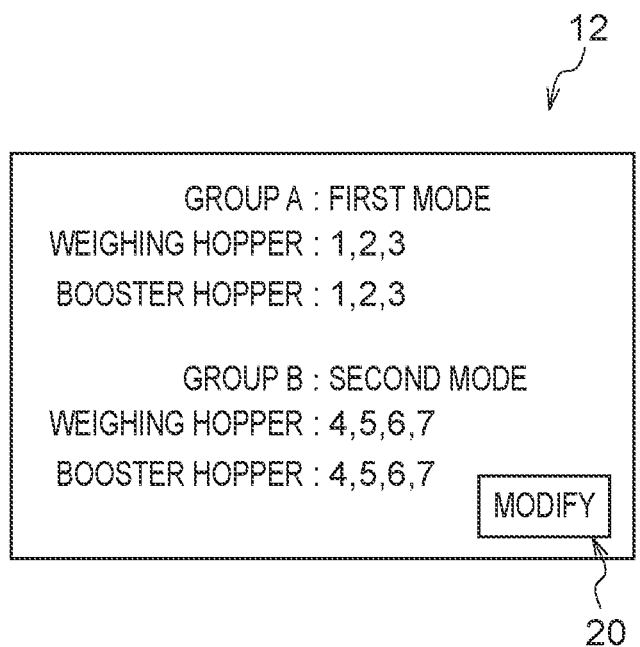
FIG. 2 is a diagram illustrating an example of a display by a display unit of the combination weighing device according to the first embodiment.

The display unit 12 displays whether either the first mode or the second mode has been set for each of the aforementioned groups, as illustrated in FIG. 2.

In the example of FIG. 2, the display unit 12 displays that weighing hoppers #1-#3 and booster hoppers #1-#3 belong to group A, weighing hoppers #4-#7 and booster hoppers #4-7 belong to group B, group A is set to the first mode, and group B is set to the second mode.

Here, the display unit 12 may be the display of the operation unit of the combination weighing device 1.

The user can set each of the above groups to either the first mode or the second mode via the display unit 12. For example, the user can make such settings by operating the operation unit while looking at the display of the operation unit.

Figure 3:
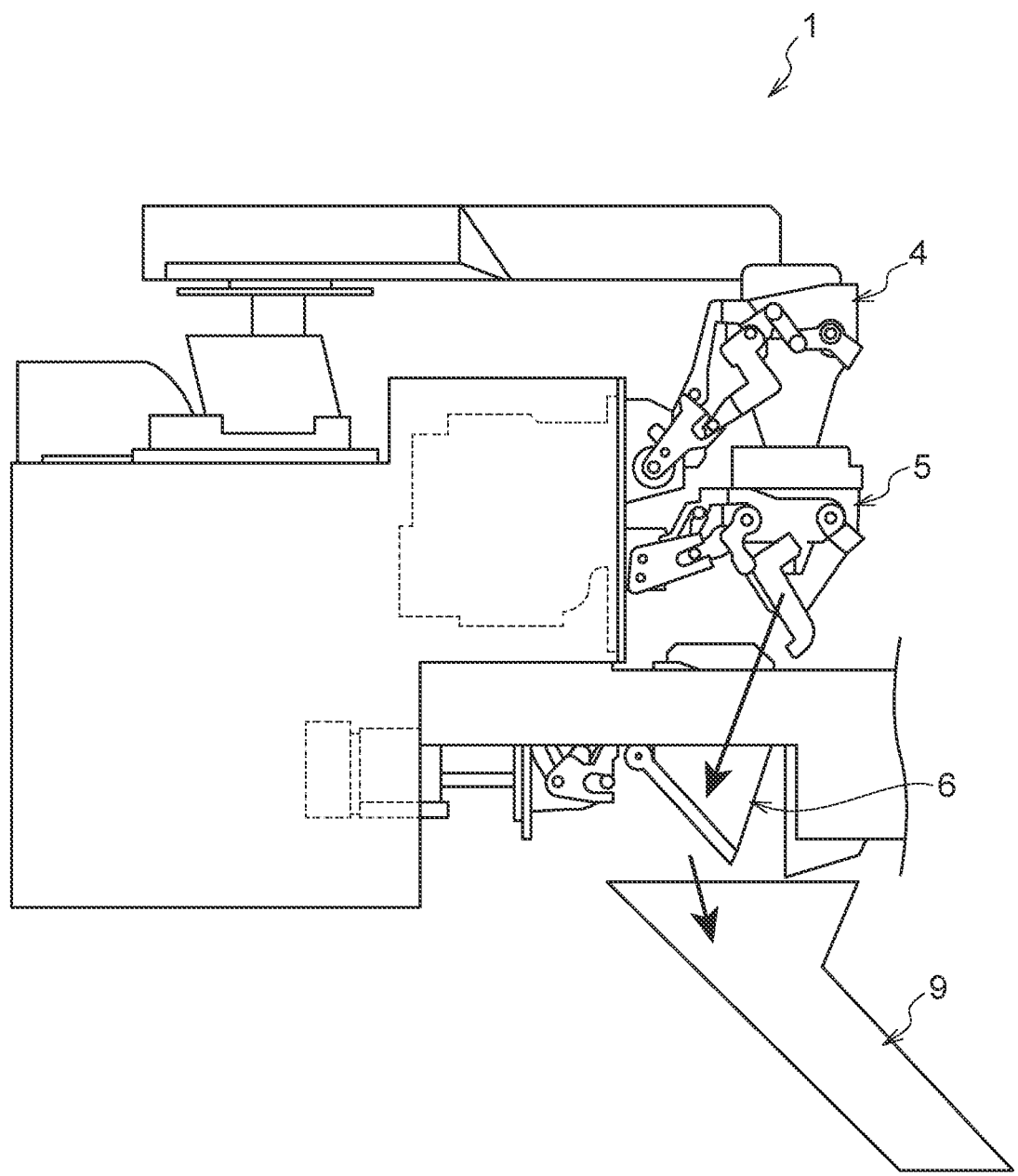
FIG. 3 is a diagram illustrating an example of a method of discharging articles in a group that is set to a first mode in the combination weighing device according to the first embodiment.

As illustrated in FIG. 3, in the case of the group set to the first mode, the controller 11 discharges the articles retained in each weighing hopper 5 into the discharge chute 9 via the booster hopper 6. In this case, the weighing hopper 5 always discharges articles to the booster hopper 6.

More specifically, the controller 11 uses, in the combination weighing, the weighing values of the articles retained in the booster hopper 6, or the weighing values of the articles in the weighing hopper 5 and the booster hopper 6 which have been added together, when the articles are retained in the weighing hopper 5 and the booster hopper 6 respectively at the timing of the combination weighing.

Here, when both the weighing hopper 5 and the booster hopper 6 are selected for the combination weighing, the controller 11 controls the gate opening timing of the weighing hopper 5 and the booster hopper 6 so that, during the repeated weighing cycle of the combination weighing, the articles retained in the weighing hopper 5 are discharged to the booster hopper 6 to form a lump of articles (one article group) in the booster hopper 6, and then the articles are discharged from the booster hopper 6.

By forming a lump of articles (one article group) in the booster hopper 6 as described above, the operation of discharging the articles discharged from the weighing hopper 5 directly to the discharge chute 9 via the booster hopper 6 can be suppressed. As a result, the likelihood of cracking and chipping can be reduced.

In the foregoing, a weighing cycle signifies a series of processes, starting with the input of an interlocking signal for discharging articles which is transmitted from an article processing device located downstream to the combination weighing device 1, and then performing combination weighing, discharging the articles, and supplying the articles provided for the next weighing cycle.

In addition, the controller 11 uses, in the combination weighing, the weighing values of the articles that are retained in the weighing hopper 5 when the articles are retained in the weighing hopper 5 and not retained in the booster hopper 6 at the timing of combination weighing. When the weighing hopper 5 is selected for the combination weighing, the controller 11 controls the gate opening timing of the weighing hopper 5 and the booster hopper 6 so that, during the repeated weighing cycle of the combination weighing, the articles retained in the weighing hopper 5 are discharged to the booster hopper 6, and the articles are temporarily retained in the booster hopper 6 before being discharged from the booster hopper 6.

According to this configuration, the drop when the articles are discharged from each weighing hopper 5 to the discharge chute 9 (or conveyor belt) can be reduced, and the likelihood of cracking and chipping of the articles can be reduced.

Therefore, it is preferable to set, to the first mode, the group to which the weighing hopper 5 and the booster hopper 6, which are used for combination weighing of articles susceptible to cracking, belong.

In other words, in the group that is set to the first mode (group A in FIG. 2), the articles retained in the weighing hopper 5 are discharged, within one weighing cycle, to the receiving part (the discharge chute 9 or conveyor belt) via the booster hopper 6.

On the other hand, as illustrated in FIG. 4, in the group that is set to the second mode, the articles retained in each weighing hopper 5 are discharged either to the booster hoppers 6 or to the discharge chutes 9 (or the conveyor belts).

According to such a configuration, the likelihood of cracking and chipping of articles is high due to the large drop when the articles are discharged from the weighing hopper 5 to the discharge chutes 9 (or the conveyor belts), but the weighing accuracy can be improved because of the increased number of combinations of hoppers discharging the articles.

In other words, the controller 11 is capable, at the time of combination weighing, of selecting the weighing value of the articles retained in only the weighing hoppers 5, the weighing value of the articles retained in only the booster hoppers 6, and the sum value of the weighing values of the articles retained in the weighing hoppers 5 and the booster hoppers 6 respectively, even when articles are retained in the weighing hoppers 5 and the booster hoppers 6.

Therefore, it is preferable to set, to the second mode, the group to which the weighing hopper 5 and the booster hopper 6, which are used for combination weighing of articles which are hard to crack, belong.

The combination weighing device 1 according to this embodiment enables cracking and chipping of articles to be minimized while improving weighing accuracy.

For example, when performing combination weighing of two types of articles, the group to which the hopper that handles articles susceptible to cracking belongs is set to the first mode, and the group to which the hopper that handles articles less susceptible to cracking belongs is set to the second mode. As a result, it is possible to minimize the cracking and chipping of articles susceptible to cracking and to improve the overall weighing accuracy by correcting the first mode, which has poor weighing accuracy, with the second mode, which has favorable weighing accuracy.

Here, when articles are discharged from each of the group set to the first mode (group A in FIG. 2) and the group set to the second mode (group B in FIG. 2) in one weighing cycle, each of the discharged articles is discharged as a lump of articles (one article group) to the receiving part (the discharge chute 9 or conveyor belt).

The articles discharged from the group set to the first mode (group A in FIG. 2) are temporarily retained in the booster hopper 6 before being discharged from the booster hopper 6 to the receiving part (discharge chute 9 or conveyor belt) within one weighing cycle, to form a lump of articles (one article group) together with the articles discharged from the group set to the second mode (group B in FIG. 2).

Modification Example 1

A combination weighing device 1 according to a modification example 1 is described hereinbelow by focusing on the differences from the combination weighing device 1 according to the aforementioned embodiment.

In modification example 1, in the group set to the second mode, when the controller 11 selects, as the aforementioned articles constituting the target as a result of the combination weighing, the articles retained in the weighing hopper 5 which corresponds to the booster hopper 6 in which the articles are not retained, the articles retained in the weighing hopper 5 are discharged to the booster hopper 6 and not to the receiving part (the discharge chute 9 or conveyor belt).

Furthermore, in modification example 1, in the group set to the second mode, when the controller 11 simultaneously selects, as the aforementioned articles constituting the target, the articles retained in the booster hopper 6 and the articles retained in the weighing hopper 5 corresponding to the booster hopper 6, the articles retained in the weighing hopper 5 are discharged to the booster hopper 6 and, together with the articles retained in the booster hopper 6, are discharged to the receiving part (the discharge chute 9 or conveyor belt) as a lump of articles (one article group).

In addition, in modification example 1, in the group that is set to the second mode, the controller 11 decides whether to discharge the articles retained in the weighing hopper 5 to the booster hopper 6 or to the receiving part (the discharge chute 9 or conveyor belt) on the basis of the throughput per unit time (the processing capacity) that is currently set.

For example, in the group that is set to the second mode, when the combination weighing device 1 is currently set to a throughput of 60 bags/minute, the controller 11 may decide to discharge such articles to the booster hopper 6, even though the device is configured to discharge articles that are retained in the weighing hopper 5 directly to the receiving part.

In other words, in the group that is set to the second mode, the controller 11 may decide to discharge the articles that are retained in the weighing hopper 5 to the booster hopper 6 when the throughput per unit time that is currently set in the combination weighing device 1 is less than or equal to a predetermined threshold value.

According to such a configuration, when the throughput per unit time (the processing capacity) is slow, the articles can be discharged to the receiving part via the booster hopper 6, taking into account the cracking and chipping of the articles.

Modification Example 2

A combination weighing device 1 according to a modification example 2 is described hereinbelow by focusing on the differences from the combination weighing device 1 according to the foregoing embodiment.

In modification example 2, the weighing hopper 5 and the booster hopper 6 which belong to the group set to the first mode are double-swing hoppers. On the other hand, the weighing hopper 5 and the booster hopper 6 which belong to the group set to the first mode may be double-swing hoppers or single-swing hoppers.

According to such a configuration, hoppers of different structures can be mixed in the combination weighing device 1, and appropriate hoppers can be deployed for each group.

Figure 5:
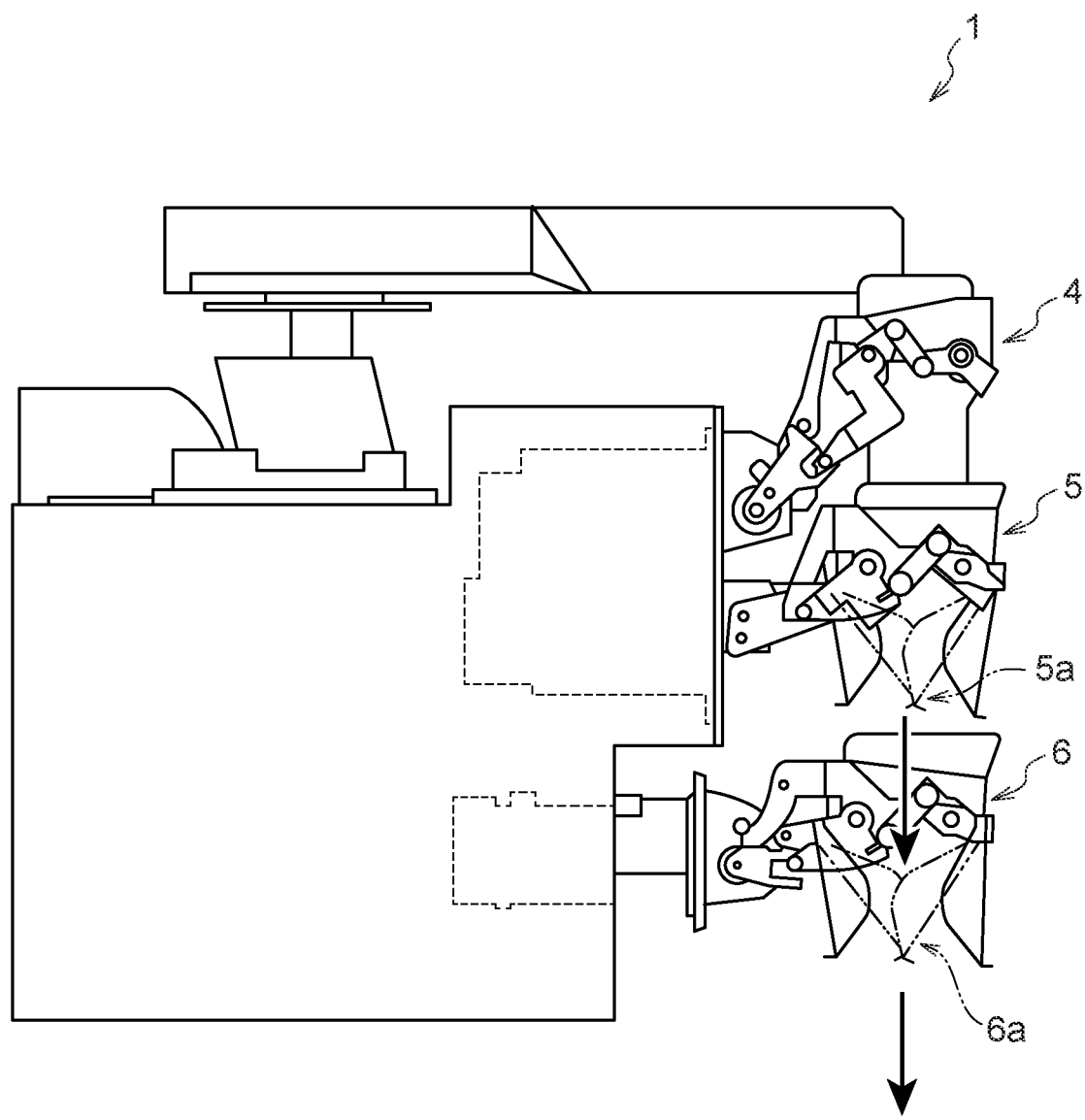
FIG. 5 is a diagram illustrating an example of the combination weighing device according to a modification example 2.

Moreover, in modification example 2, as illustrated in FIG. 5, a discharge port 5a of the weighing hopper 5 and a discharge port 6a of the booster hopper 6 which belong to the group set to the first mode are aligned in a substantially vertical direction.

By using a configuration like that described above, adhesion to the gates of the weighing hoppers 5 and booster hoppers 6 can be reduced.

Although the present invention is explained in detail using the above-mentioned embodiments, it will be apparent to those skilled in the art that the present invention is not limited to the embodiments described herein. The present invention can be implemented as modifications and changes without departing from the spirit and scope of the present invention defined by the description of the claims. Accordingly, the description of the present specification is for the purpose of illustration and is not intended to limit the present invention in any way.

What is claimed is:

1. A combination weighing device that performs combination weighing of at least two different articles, the device comprising:
    a plurality of weighing hoppers that temporarily retain the articles and acquire weighing values of the retained articles before discharging the articles downstream;
    a plurality of booster hoppers that are arranged downstream of the weighing hoppers and temporarily retain the articles discharged from the weighing hoppers before discharging the articles downstream;
    a receiver that receives the articles discharged from the weighing hoppers or the booster hoppers; and
    a controller that performs combination weighing on the basis of the acquired weighing values and discharges the articles constituting a target from the weighing hoppers or the booster hoppers, wherein
    the weighing hoppers and the booster hoppers are divided into at least two groups on the basis of types of the articles,
    the controller sets each of the groups to either a first mode or a second mode on the basis of the types of the articles,
    in the group set to the first mode, the articles retained in a first weighing hopper are discharged to the receiver via a first booster hopper, and
    in the group set to the second mode, the articles retained in a second weighing hopper are discharged to either a second booster hopper or the receiver.

2. The combination weighing device according to claim 1, wherein
    in the group set to the first mode, the articles retained in the first weighing hopper are discharged, within one weighing cycle, to the receiver via the first booster hopper.

3. The combination weighing device according to claim 1, wherein
    when the articles are discharged from the group set to the first mode and the group set to the second mode, respectively, in one weighing cycle, the respective discharged articles are discharged to the receiver as one article group.

4. The combination weighing device according to claim 3, wherein
    the articles discharged from the group set to the first mode are temporarily retained in the first booster hopper before being discharged from the first booster hopper to the receiver within one weighing cycle, to form the one article group together with the articles discharged from the group set to the second mode.

5. The combination weighing device according to claim 1, further comprising:
    a display unit that displays whether the first mode or the second mode has been set for each of the groups, wherein
    a user is able to set, via the display unit, each of the groups to either the first mode or the second mode.

6. The combination weighing device according to claim 1, wherein
    in the group set to the second mode, when the controller selects, as the articles constituting the target, the articles retained in the second weighing hopper which corresponds to the second booster hopper in which the articles are not retained, the articles retained in the second weighing hopper are discharged to the second booster hopper.

7. The combination weighing device according to claim 1, wherein
    in the group set to the second mode, when the controller simultaneously selects, as the articles constituting the target, the articles retained in the second booster hopper and the articles retained in the second weighing hopper corresponding to the second booster hopper, the articles retained in the second weighing hopper are discharged to the second booster hopper and are discharged to the receiver as one article group together with the articles retained in the second booster hopper.

8. The combination weighing device according to claim 1, wherein
    in the group set to the second mode, the controller decides whether to discharge the articles retained in the second weighing hopper to the second booster hopper or to the receiver on the basis of throughput per unit time that is currently set.

9. The combination weighing device according to claim 1, wherein
    the first weighing hopper and the first booster hopper which belong to the group set to the first mode are double-swing hoppers.

10. The combination weighing device according to claim 1, wherein
    discharge ports of the first weighing hopper and the first booster hopper which belong to the group set to the first mode are aligned in a substantially vertical direction.

\* \* \* \* \*